UNITED STATES PATENT OFFICE.

EDWIN C. SMITH, OF BRANDON, VERMONT.

IMPROVED STOVE-POLISH.

Specification forming part of Letters Patent No. 79,508, dated June 30, 1868.

*To all whom it may concern:*

Be it known that I, EDWIN C. SMITH, of Brandon, in the county of Rutland and State of Vermont, have invented and compounded a new and Improved Stove-Dressing, which I have denominated "Champion Iron-Polish;" and I do hereby declare that the following is a full and exact description thereof, and of the ingredients composing the same.

Directions: Take half a pound of roasted and ground wheat, half an ounce of dissolved glue, half an ounce of gum-tragacanth, half a pound of fine-sifted iron-filings, and a quarter of a pound of roasted and ground coffee, boil the whole together for thirty minutes, strain, then add one pound of silver-lead and one quart of alcohol. Mix the whole together thoroughly, and put in bottles, and cork tight.

What I claim as my invention and discovery, and desire to secure by Letters Patent, is—

A stove-polish composed of the ingredients set forth, substantially as described.

EDWIN C. SMITH.

Witnesses:
   WESLEY MORRILL,
   GEO. L. FLETCHER.